(12) United States Patent
Gorek et al.

(10) Patent No.: US 7,256,582 B2
(45) Date of Patent: Aug. 14, 2007

(54) METHOD AND APPARATUS FOR IMPROVED CURRENT FOCUSING IN GALVANIC RESISTIVITY MEASUREMENT TOOLS FOR WIRELINE AND MEASUREMENT-WHILE-DRILLING APPLICATIONS

(75) Inventors: Matthias Gorek, Lower Saxony (DE); Martin Folberth, Lower Saxony (DE); Christian Fulda, Lower Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 13 days.

(21) Appl. No.: 11/110,620

(22) Filed: Apr. 20, 2005

(65) Prior Publication Data

US 2006/0238202 A1  Oct. 26, 2006

(51) Int. Cl.
*G01V 3/02* (2006.01)
*G01V 3/18* (2006.01)
(52) U.S. Cl. ............... 324/373; 324/375; 324/347; 324/358
(58) Field of Classification Search ............ 324/347, 324/351–358, 366–375; 702/7; 175/40, 175/50
See application file for complete search history.

(56) References Cited

U.S. PATENT DOCUMENTS

| | | | |
|---|---|---|---|
| 2,930,969 A | 3/1960 | Baker | 324/10 |
| 3,096,477 A | 7/1963 | Smith et al. | 324/1 |
| 3,365,658 A | 1/1968 | Birdwell | 324/10 |
| 3,379,963 A | 4/1968 | Saurenman | 324/10 |
| 3,772,589 A | 11/1973 | Scholberg | 324/10 |
| 3,882,376 A | 5/1975 | Schuster | 324/10 |
| 4,122,387 A | 10/1978 | Ajam et al. | 324/10 |
| 4,335,353 A * | 6/1982 | Lacour-Gayet | 324/366 |
| 4,468,623 A | 8/1984 | Gianzero et al. | 324/367 |
| 4,583,046 A * | 4/1986 | Vinegar et al. | 324/373 |
| 5,339,037 A | 8/1994 | Bonner et al. | 324/366 |
| 5,396,175 A | 3/1995 | Seeman | 324/375 |
| 5,502,686 A | 3/1996 | Dory et al. | 367/34 |
| 6,025,722 A | 2/2000 | Evans et al. | 324/373 |
| 6,348,796 B2 | 2/2002 | Evans et al. | 324/374 |
| 6,373,254 B1 | 4/2002 | Dion et al. | 324/369 |
| 6,891,377 B2 | 5/2005 | Cheung et al. | 324/374 |
| 2004/0245991 A1 | 12/2004 | Hayman et al. | 324/374 |
| 2005/0134280 A1 | 6/2005 | Bittar et al. | 324/367 |

FOREIGN PATENT DOCUMENTS

CA           685727          5/1964

OTHER PUBLICATIONS

J.W. Smits et al.; *High Resolution From a New Laterolog With Azimuthal Imaging*, SPE 30584, 1995 SPE Annual Technical Conference and Exhibition, Oct. 22-25, 1995, pp. 563-576, 14 Figs.
D.H. Davies et al.; *Azimuthal Resistivity Imaging: A New Generation Laterolog*, SPE 24676, 67th Annual Technical Conference and Exhibition, Oct. 4-7, 1992, pp. 143-153, 16 Figs.

* cited by examiner

*Primary Examiner*—Jay M. Patidar
(74) *Attorney, Agent, or Firm*—Madan, Mossman & Sriram, P.C.

(57) ABSTRACT

A galvanic resistivity tool with one or more measurement electrodes and guard electrodes, and one or more shielding electrodes. The potential difference between the measurement electrodes and the guard electrodes is controlled to minimize current flow between the measurement electrodes and the shielding electrodes. This provides improved focusing and avoids effects of contact impedance.

21 Claims, 15 Drawing Sheets

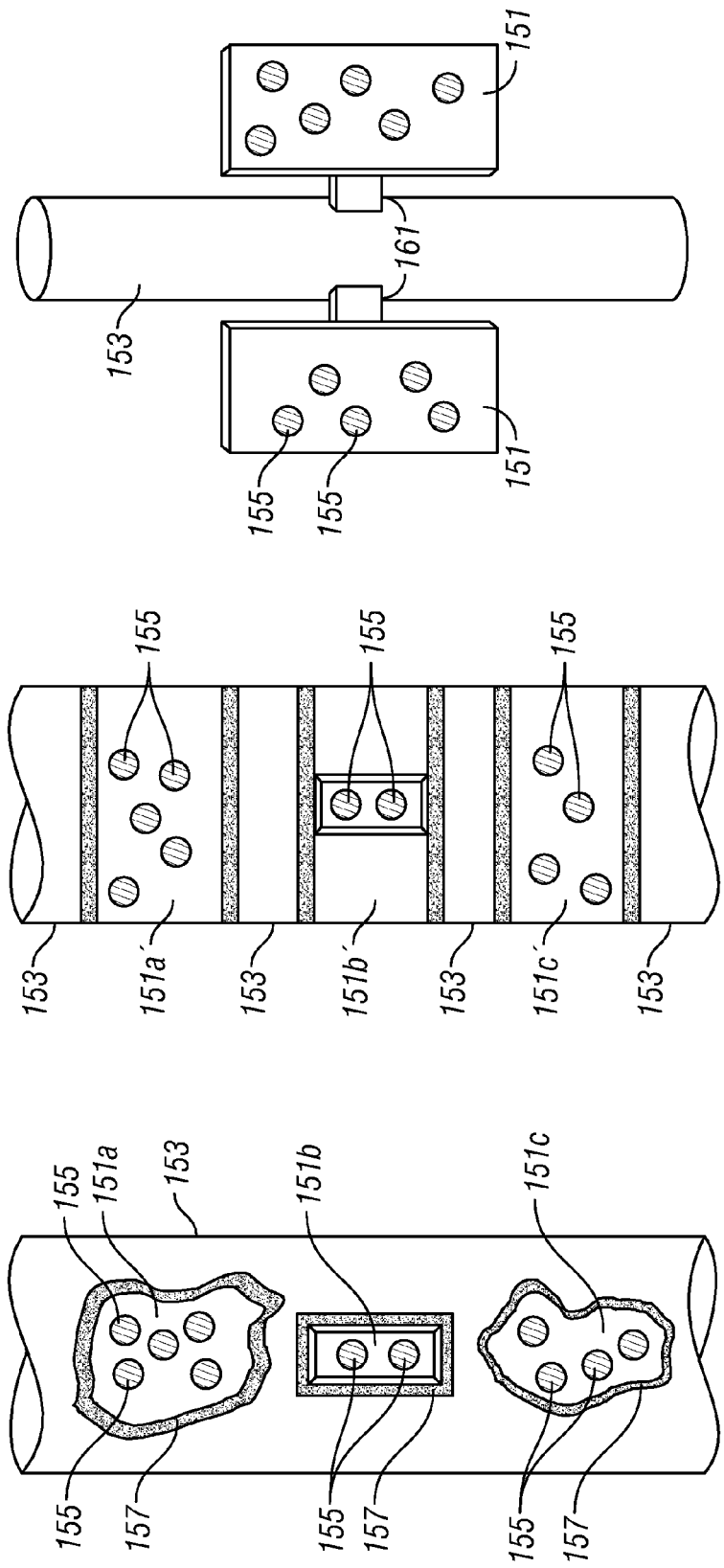

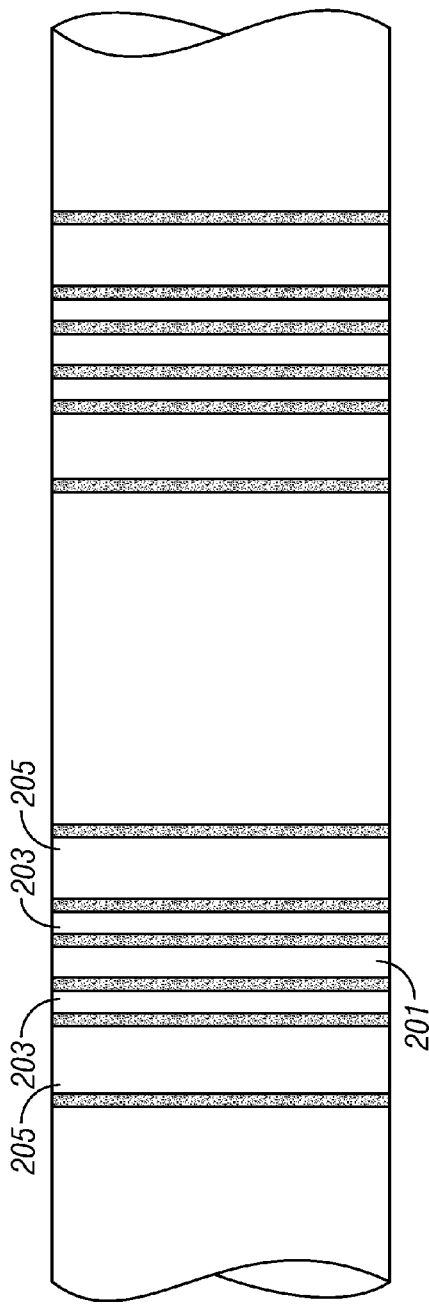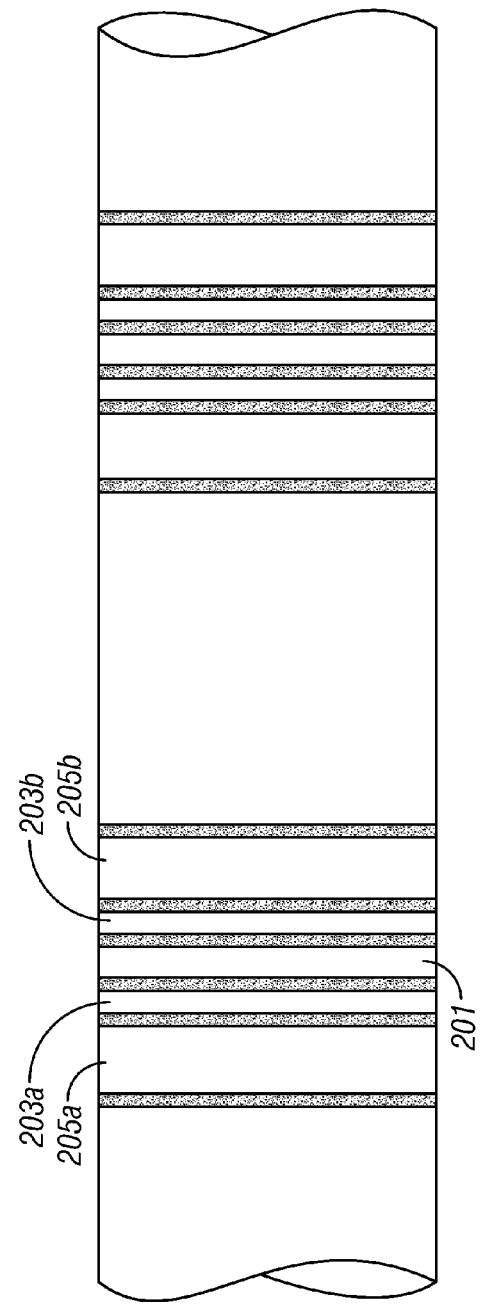

METHOD AND APPARATUS FOR IMPROVED CURRENT FOCUSING IN GALVANIC RESISTIVITY MEASUREMENT TOOLS FOR WIRELINE AND MEASUREMENT-WHILE-DRILLING APPLICATIONS

BACKGROUND OF THE INVENTION

1. Field of the Invention

The present invention relates to well logging. In particular, the present invention is an apparatus and method for determining the resistivity of subsurface formations using electrical methods.

2. Background of the Art

In conventional galvanic resistivity measurement tools using a focusing technique, a guard electrode emits current in order to lead the current beam of a measurement electrode deeper into a conductive material. The resistivity of the material is determined by means of measurement electrode's voltage and current registration. The driving potential on guard and measurement electrode must be exactly the same to avoid disturbances of the ideal electrical field, which makes sure that the focusing effect takes place. Higher driving potential differences may lead to currents from guard to measurement electrode or vice versa passing the borehole fluid around the tool, which would completely destroy the focusing effect and lead to high measurement errors if not considered. In general, the focusing effect will lead to an electrical current with a higher penetration depth compared to that without focusing.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Pat. No. 685,727 to Mann et al. U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separately measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The electrochemical equilibration process between a metal (e.g. electrode) and an electrolytic fluid leads to layers of complex resistive behavior. The impedance of these layers is called contact impedance. When current flows into or from an electrode, a difference between the potential immediately outside and inside the electrode will be created by the impedance layer. Contact impedances are highly variable and nonlinear. They depend mainly on electrode material, electrochemical properties of the fluid, current density and frequency of the applied voltages. In natural environments, the formation is filled with fluid whose chemical composition is not completely controllable, it is almost impossible to predict exactly contact impedances for measurement and guard electrodes. The focusing effect will be weakened or damaged whenever the potentials of guard and measurement electrodes beyond the impedance layer become different. This difference could cause a current to flow through the mud between the electrodes. The contact impedance thus has at least significant impact on the resolution of the measurement.

U.S. Pat. No. 6,373,254 to Dion et al. describes a method and apparatus to control the effect of contact impedance on a formation resistivity measurement during a logging-while-drilling operation. The control of contact impedance is accomplished by maintaining a substantially zero difference in potential between two monitor electrodes positioned on the resistivity logging tool near a current electrode.

Others have discussed the use of monitor electrodes for wireline applications. See, for example, Davies et al. (SPE24676), Evans et al. (U.S. Pat. No. 6,025,722), Seeman (U.S. Pat. No. 5,396,175), Smits et al. (SPE 30584), and Scholberg (U.S. Pat. No. 3,772,589). The monitor electrode technique uses two additional electrodes (called monitor electrodes) located between measurement and guard electrode to observe a possible potential difference. The potential on measurement or guard electrode is adjusted by means of a control circuit in order to keep the voltage between the monitor electrodes ideally at zero. Monitor electrodes emit no current and are therefore assumed to be unaffected by contact impedances. From the minimum voltage drop between the monitor electrodes it is concluded that the potential difference between guard and measurement electrodes each beyond the impedance layer immediately outside the electrode is zero.

The problem of contact impedances during logging while drilling/measurement while drilling (LWD/MWD) applications differs from that of wireline applications because of the significantly higher mechanical strain of the measurement tool during operation. The mechanical requirements of an electrode in LWD/MWD tools require that isolating gaps in the electrode should be small compared to the isolation gaps in laterolog tools. Therefore, the response of LWD/MWD resistivity tools is different from their wireline counterparts. Bonner et al. (U.S. Pat. No. 5,339,037) teach an MWD device in which an electrically isolated electrode measures voltages resulting from excitation of two spaced apart transmitters. Simultaneously, monitor currents are measured. The resistivity is obtained from the voltages and monitor current values. Bonner does not address the issue of contact impedances.

Evans et al. (U.S. Pat. No. 6,348,796) describes a method to enhance the conventional focusing technology by using three electrodes which are operated on different potentials. The current electrode which is operated on a medium potential is surrounded by another electrode with a potential some μV lower. Another electrode around these both electrodes is driven some μV higher than the current electrode. The issue of contact impedances is not addressed in Evans.

It would be desirable to have an apparatus and method for providing enhanced focusing technology combined with the capability to be substantially independent of contact impedances as well as changes of environment resistivity. It is also preferable that the apparatus could be used for MWD as well as wireline operations. The present invention satisfies this need.

SUMMARY OF THE INVENTION

One embodiment of the invention is an apparatus for determining a resistivity parameter of an earth formation. The apparatus includes a logging tool in a borehole in the earth formation. The logging tool has at least one measurement electrode that conveys a measure current into the earth formation. At least one guard electrode associated with the at least one measurement electrode focuses the measure current. A shielding electrode is interposed between the at least one guard electrode and the at least one measurement electrode. The apparatus includes circuitry that minimizes a current flow between the at least one measurement electrode and the shielding electrode. The circuitry may include a processor that alters a potential of the at least one measurement electrode, a current supplied to the at least one measurement electrode, an impedance between the at least one guard electrode and the at least one measurement electrode, and/or a potential of the at least one guard electrode. A processor may determine from the measure current and a potential of the guard electrode and/or the measurement electrode an apparent resistance related to the resistivity parameter. The resistivity of the formation may be derived from the apparent resistance. The determined apparent resistance is substantially independent of at a standoff of the logging tool, and/or a resistivity of a fluid in the borehole. The apparatus may include a conveyance device such as a wireline or a drilling tubular. An orientation sensor may be provided, the output of the orientation sensor being used to provide a resistivity image of the borehole. An additional shielding electrode may be provided outside the guard electrode. The processor may be at a surface location or a downhole location. The measurement electrode, the shielding electrode and the guard electrode may be ring-shaped.

Another embodiment of the invention is a method of determining a resistivity parameter of an earth formation. A measure current is conveyed into the earth formation using a measurement electrode on a logging tool in the earth formation. The measure current is focused using a guard electrode on the logging tool. The measurement electrode is shielded from the guard electrode. A current flow between the measurement electrode and the shielding electrode is minimized. Minimizing the current flow may be done by altering a potential of the measurement electrode, altering a current supplied to the measurement electrode, altering an impedance between the guard electrode and the measurement electrode, and/or altering a potential of the guard electrode. An apparent resistance related to the resistivity parameter may be determined from the measure current and a potential of the guard electrode or the measurement electrode The determined apparent resistance is substantially independent of a standoff of the logging tool, and/or a resistivity of a fluid in the borehole. The logging tool may be conveyed into the borehole on a drilling tubular with a bottomhole assembly carrying the logging tool, or on a wireline. A resistivity image of the borehole may be produced.

Another embodiment of the invention is a computer readable medium for use with a logging tool used in a borehole in an earth formation. The logging tool includes a measurement electrode which conveys a measure current into the earth formation and a guard electrode which focuses the measure current. The logging tool also has shielding electrode positioned between the guard electrode and the measurement electrode. The medium includes instructions enabling minimizing a current flow between the measurement electrode and the shielding electrode, and the determination of an apparent resistance from the measure current and a potential of the guard or measurement electrode.

BRIEF DESCRIPTION OF THE FIGURES

The novel features that are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIGS. 6a–6d illustrate different arrangements by which the electrode configuration of FIG. 3 can be achieved;

FIG. 7 illustrates the electrode configuration of an alternate embodiment of the invention;

DETAILED DESCRIPTION OF THE INVENTION

Figure 1:
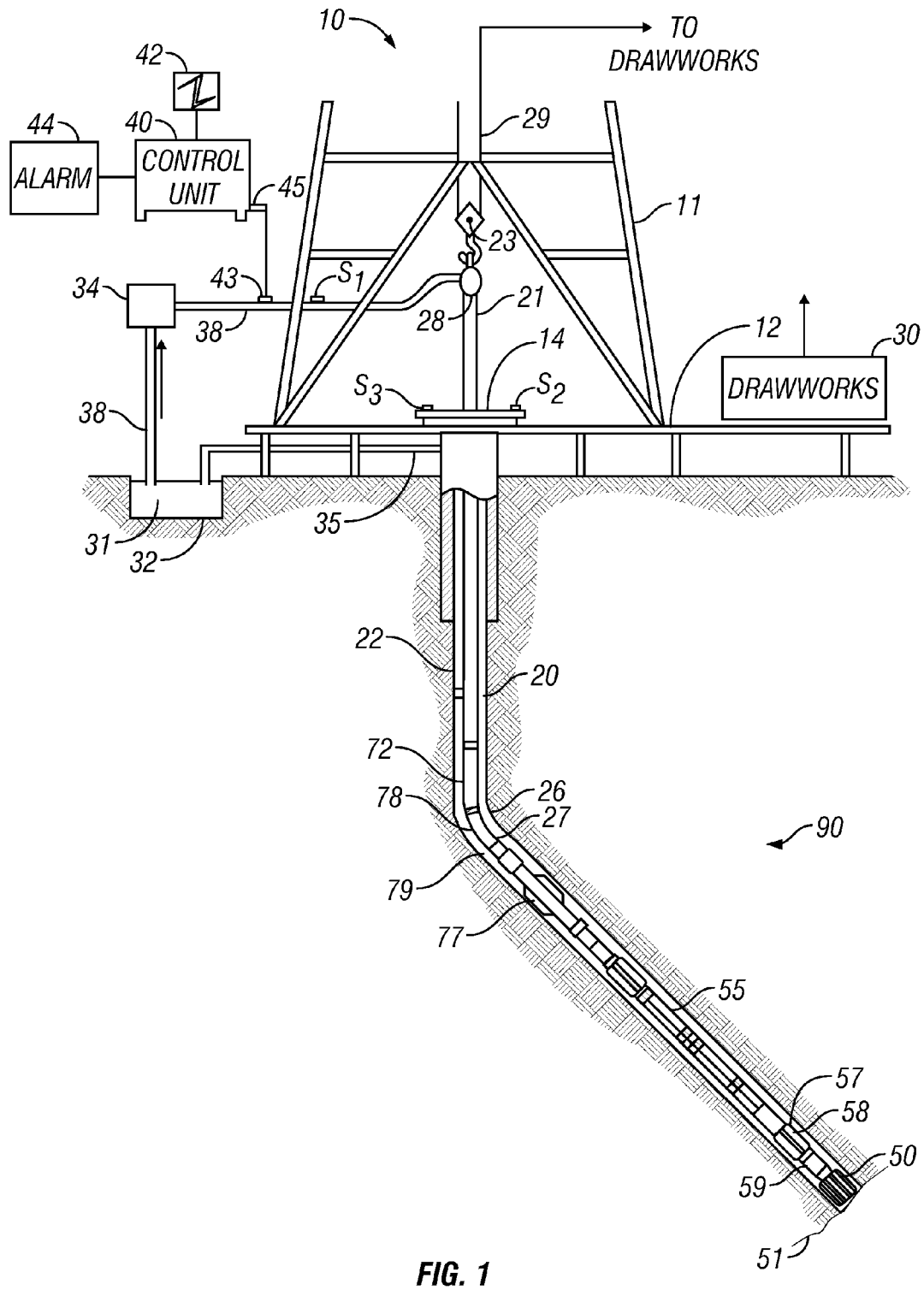
FIG. 1 (prior art) is a schematic illustration of a drilling system.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger 36, fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

Figure 2:
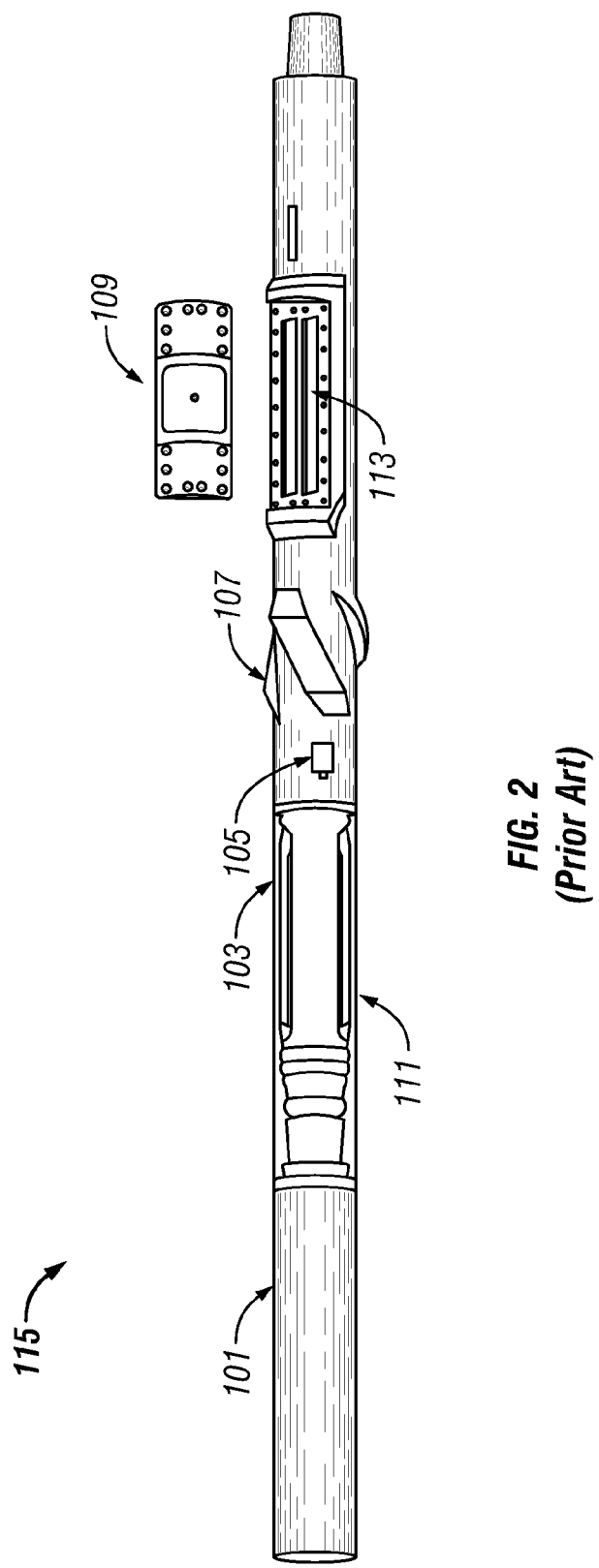
FIG. 2 (prior art) is an exemplary configuration of the various components of a resistivity measuring sensor sub.

Turning now to FIG. 2, an exemplary configuration of the various components of the resistivity measuring sensor sub is shown. At the upper end, a modular cross-over sub 101 is provided. The power and processing electronics are indicated by 103. The sub is provided with a stabilizer 107 and a data dump port may be provided at 105. A resistivity sensor (discussed further below) is provided at 109 with the sensor and measuring electronics at 113. Modular connections 115 are provided at both ends of the sub that enable the sub to be part of the bottom hole drilling assembly. An orientation sensor 111 is provided for measuring the toolface angle of the sensor assembly during continued rotation. Different types of orientation sensors may be used, including magnetometers, accelerometers, or gyroscopes. Use of such devices for determination of the toolface angle are known in the art and are not discussed further herein.

The stabilizer shown at 107 serves several functions. Like conventional stabilizers, one function is to reduce oscillations and vibrations of the sensor assembly. However, in the context of the present invention, it also serves another important function, viz, centralizing the portion of the bottom hole assembly (BHA) including a sensor assembly, and also maintaining the sensors with a specified standoff from the borehole wall. This is not visible in FIG. 2, but the outer diameter of the stabilizer is greater than the outer diameter of the portion of the BHA including the resistivity sensor. As a result of this difference in diameter, the resistivity sensor is maintained with a standoff from the borehole wall during continued rotation of the drillstring.

The present invention provides an alternative technique to overcome the problem of contact impedances in resistivity determination of geological formations. The invention uses only one additional electrode (called shielding electrode) instead of two monitor electrodes and uses a different controlling mechanism. With this method the focusing effect will be improved compared to application of the conventional monitor electrode technique.

Figure 3:
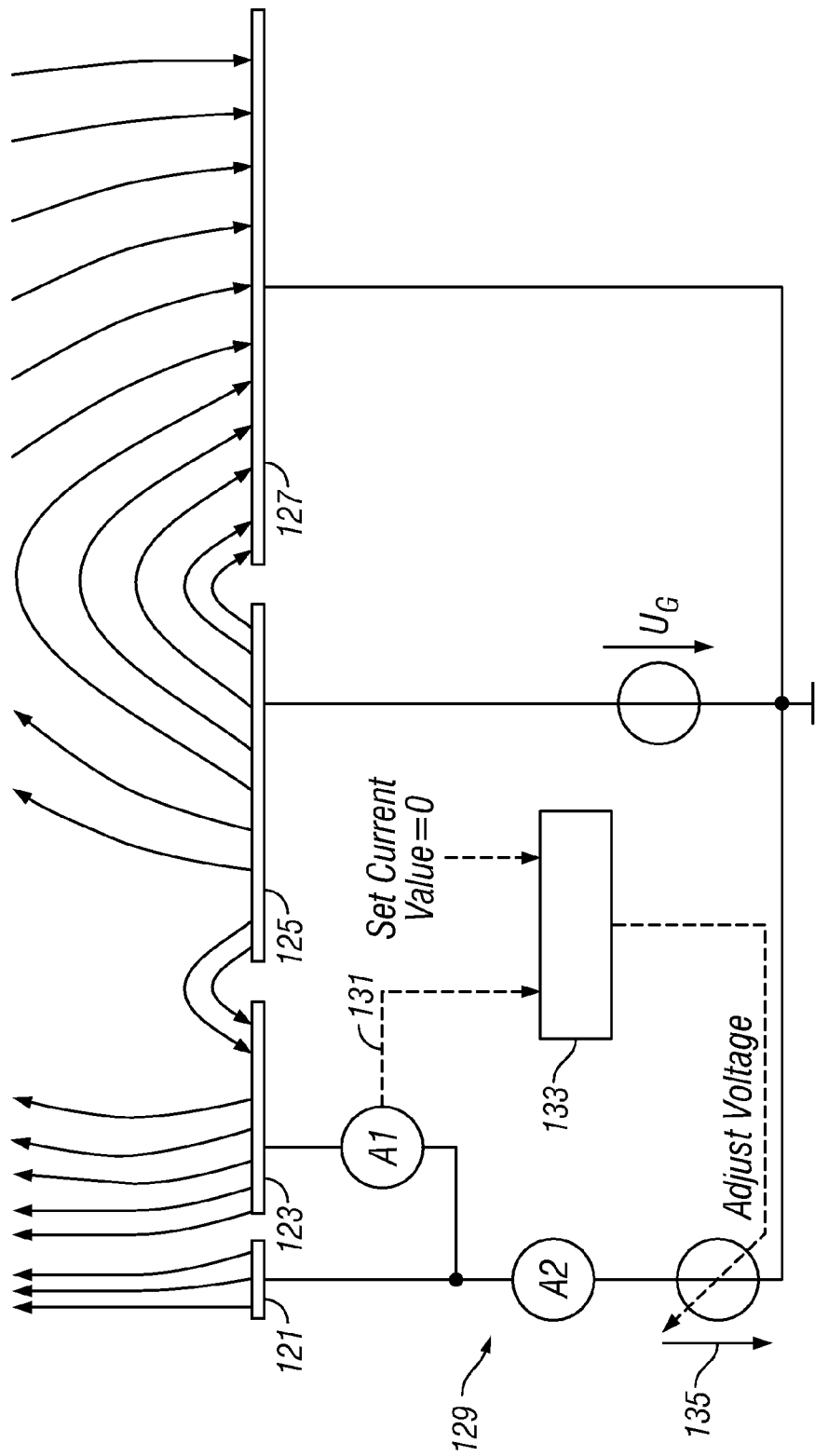
FIG. 3 is a schematic illustration of electrode configurations for the present invention.

FIG. 3 is a schematic illustration of an embodiment of the invention. There is a shielding electrode 123 located between measurement electrode 121 and guard electrode 125. If the field inside mud or formation is not ideal (see Background of the Invention), a current flow will take place inside the shielding electrode. The shielding electrode is connected to the measurement electrode via a current meter A1 which transmits the measured current value 131 to a controller 133. The controller adjusts the voltage source 135 until the current through the ammeter A1 vanishes. This condition leads to the result that current entering the shielding electrode has to leave it without influencing the measurement electronics. Because the measurement electrode has to be surrounded by the shielding electrode, the potential on guard electrode cannot be higher than, lower than, or equal than on measurement electrode to fulfill the condition of no current passing through A1. So current from guard electrode enters the shielding electrode and has to leave it into the mud or formation, because the potential between Measurement and Shielding Electrode is zero (compare FIG. 4). This effect leads to an advanced focusing.

Figure 4:
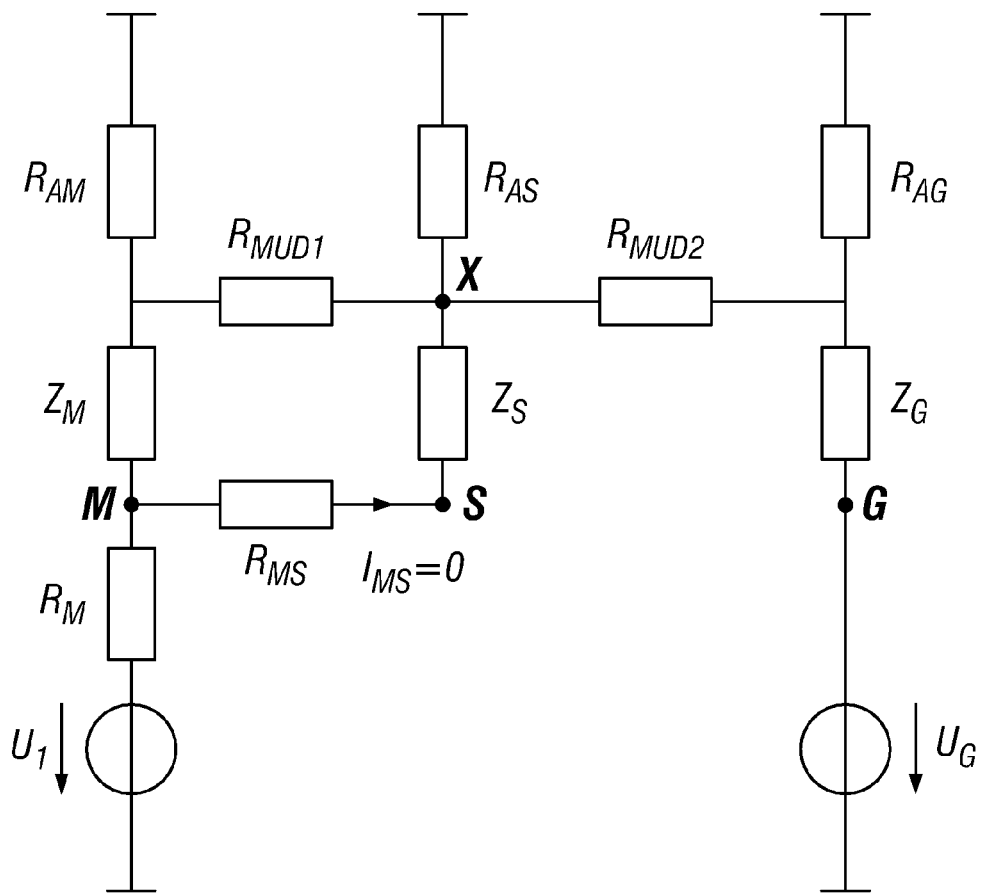
FIG. 4 shows an equivalent circuit for the electrode configuration of FIG. 3.

Referring now to FIG. 4 which is an equivalent circuit of the arrangement of FIG. 3, a measurement electrode M is provided with guard electrode G The guard electrode focus the measure current into the formation. In FIG. 4, X denotes a location inside the mud beyond the impedance layer adjacent to the shielding electrode S. $U_1$ and $U_g$ are applied voltages from one or more power sources. $R_M$ is the resistance of the measure electrode. $R_{MS}$ is the resistance of the connection from M to S. $Z_M$, $Z_S$ and $Z_G$ are the contact impedances related to the measure electrode M, the shielding electrode S and the guard electrode G. $R_{MUD1}$ and $R_{MUD2}$ are mud resistances. $R_{AM}$, $R_{AS}$ and $R_{AG}$ are apparent formation resistances for the measure electrode, the shielding electrode and the guard electrode respectively. The return R is denoted by the ground symbol in FIG. 4.

Resistivity measurements are performed by the following procedure. A voltage UG will be applied at the guard electrode G. The current $I_{MS}$ between the guard electrode and the shielding electrode is measured. The voltage $U_{MG}$ is controlled (for example, by varying the voltage $U_1$) until the current $I_{MS}$ goes to zero. Since $I_{MS}$ is zero, the potential difference between M and the point X in the mud vanishes and therefore no net current flow occurs from M to X or vice versa. The sum of the currents from M through $Z_M$ and from X through $R_{MUD1}$ will flow through $R_{AM}$. Because of this, the following holds even for unknown and unequal contact impedances $Z_M$, $Z_S$ and $Z_G$:
(1) the total current which leaves M enters the formation,
(2) no direct current from M to G can occur, and
(3) the focusing effect will be even better that it would be with no contact impedances and exactly the same potential on G and M The apparent resistivity is then calculated as:

$$\rho_a = k \cdot \frac{U_{MO}}{I_M} \quad (1)$$

where k is a constant that can be determined by calibration of the tool using known methods, $I_M$ is the current through the measurement electrode (Current Meter $R_M$), and $U_{MO}$ is the voltage between measurement electrode and return (reference) potential.

Figure 5C:
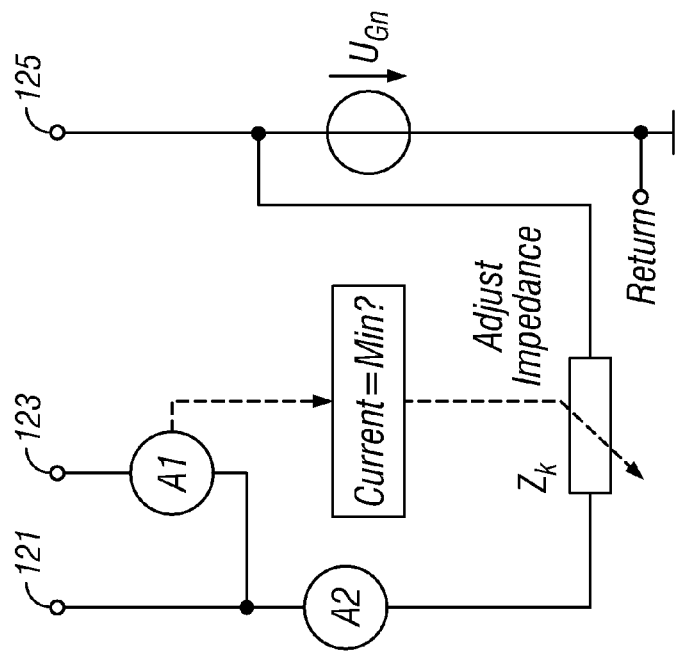
FIGS. 5a–5c illustrate embodiments of the invention in which control of the shield current is achieved by (a) adjusting a voltage source, (b) adjusting a current source, and (c) adjusting a complex resistance.
Figure 5B:
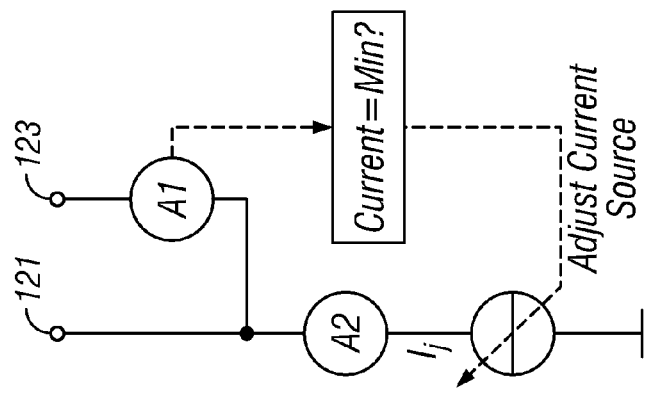
Figure 5A:
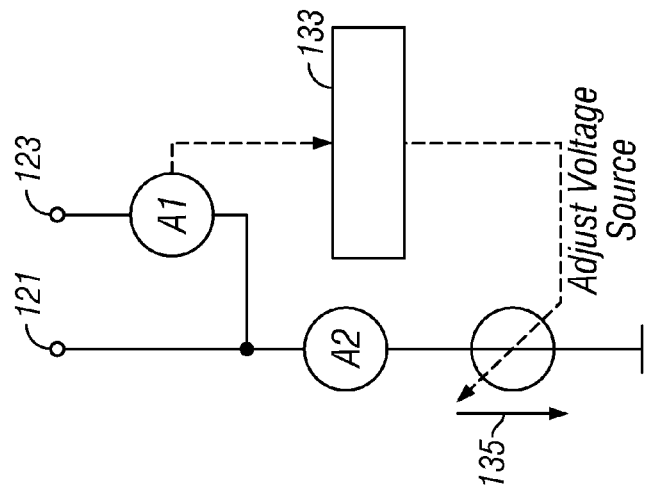

Turning now to FIGS. 5a–5c, various methods of achieving zero current between the measurement electrode and the shielding electrode are illustrated. In FIG. 5a, the voltage source 135 is controlled. In FIG. 5b, the current from a current source is controlled. In FIG. 5c, an impedance $Z_k$ is controlled, which varies the current through measurement and shielding electrode by using the potential difference of $U_{Gn}$ between the guard electrode and ground as supplying source.

Before discussing FIGS. 6a–6d, we define the basic concept of a shielded measurement electrode (SME). The SME comprises a flat measurement electrode of arbitrary form surrounded by an isolation, which is surrounded by the shielding electrode. The shielding electrode is also surrounded by isolation. The electrodes could be operated by the electronics of FIGS. 5a–c by keeping the guard potential constant.

Turning now to FIG. 6a, a tool body 153 that could be either a bottomhole assembly of an MWD arrangement or a wireline conveyed logging tool is kept at a return potential and equipped with one or more partial guard electrodes of arbitrary form 151a, 151b, 151c. The guard electrodes may be operated on different constant potentials. Each guard electrode is equipped with one or more SMEs 155. The one or more SMEs could be operated by the electronics of FIGS. 5a–c on different Potentials. In case of using impedance adjustment, the SMEs may be supplied by several parallel operated adjustable impedances using the voltage source of the accompanying guard electrode. Each of the partial guard electrodes of FIG. 6a is surrounded by an isolator 157 to isolate the guard from the return. The particular arrangement shown with guard electrode 151b is suitable for use on ribs of a MWD device.

The main difference between FIGS. 6b and 6a is that in the former, full guard electrodes 151a', 151b', 151c' are used. The particular arrangement shown with guard electrode 151b' is suitable for use on ribs of a MWD device. FIG. 6c shows guard electrodes in the form of pads that are extended from the tool body 151 by suitable extension members (isolating) 161.

In FIG. 6d a tool body that is kept on a return potential is equipped with several groups of ring electrodes. Each group consists of an inner measurement electrode ring 201 which is surrounded by two shielding electrode rings 203 that are shorted. The shielding electrode rings are surrounded by two shorted guard electrode rings 205. The different sets of shorted guard electrodes may be operated on different constant potentials. Measurement and shielding electrodes may be operated by the electronics of FIGS. 5a–c on different potentials. It is also possible to keep the measurement electrodes on different constant potentials while adjusting the potentials on the guard electrodes.

Figure 8:
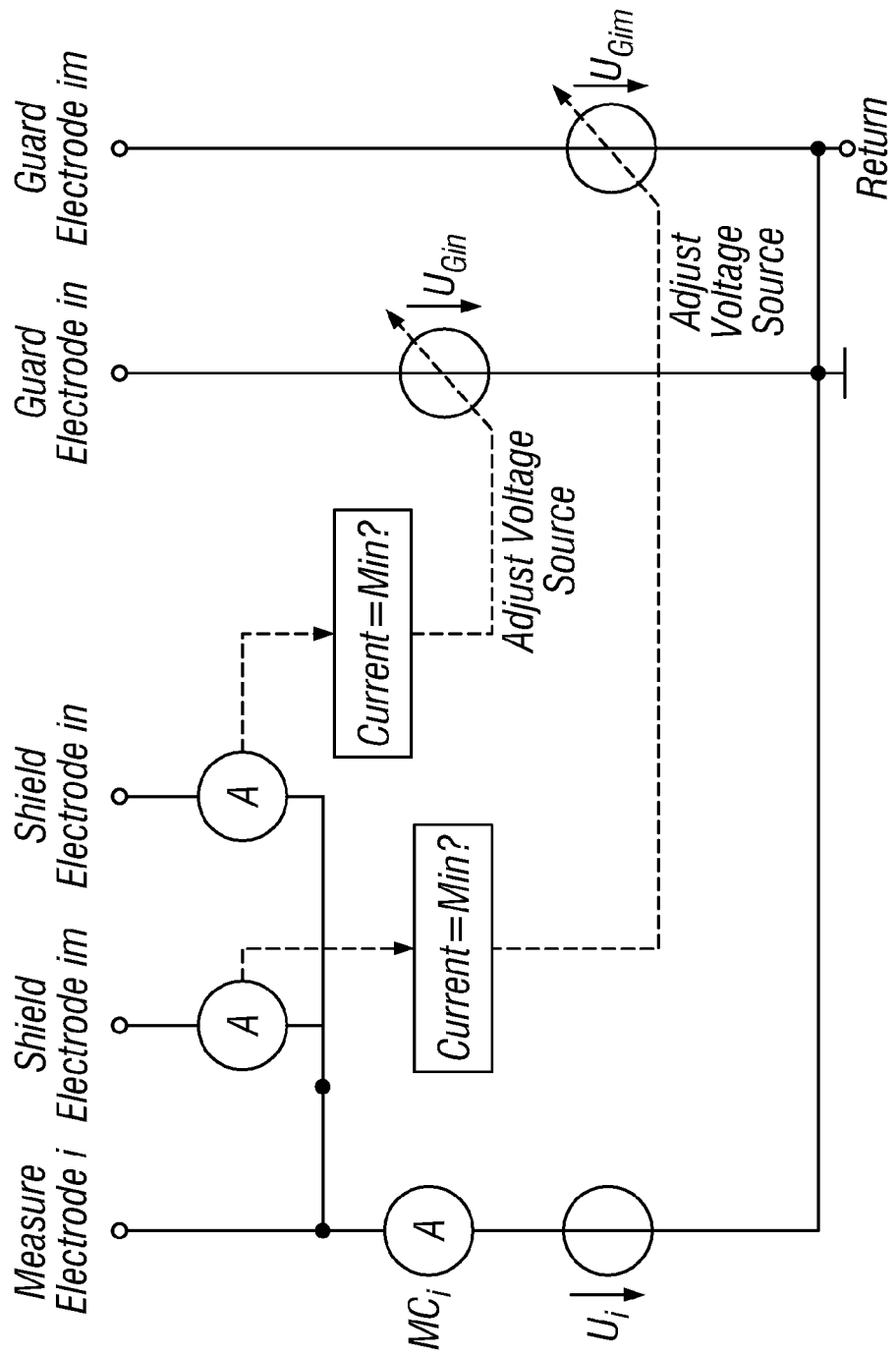
FIG. 8 is a schematic diagram for operating the embodiment of FIG. 7.

The embodiment shown in FIG. 7 is similar to that in FIG. 6d. However, the pairs of shielding electrodes 203a, 203b and the pairs of guard electrodes 205a, 205b are not shorted. To operate this embodiment the schematic of FIG. 8 should be used. The measurement electrode of a group is kept on a constant potential. The shielding current of the shielding electrode ring surrounded by measurement and guard electrode ring on each side is controlled to a minimum by adjusting the potential on the adjacent guard electrode ring. This assembly makes it possible to drive the two guard electrode rings which surround a measurement electrode on different potentials by using two separately operated shielding electrodes. This embodiment could be used to enhance focusing and vertical resolution at very high formation resistivity contrasts.

Figure 9B:
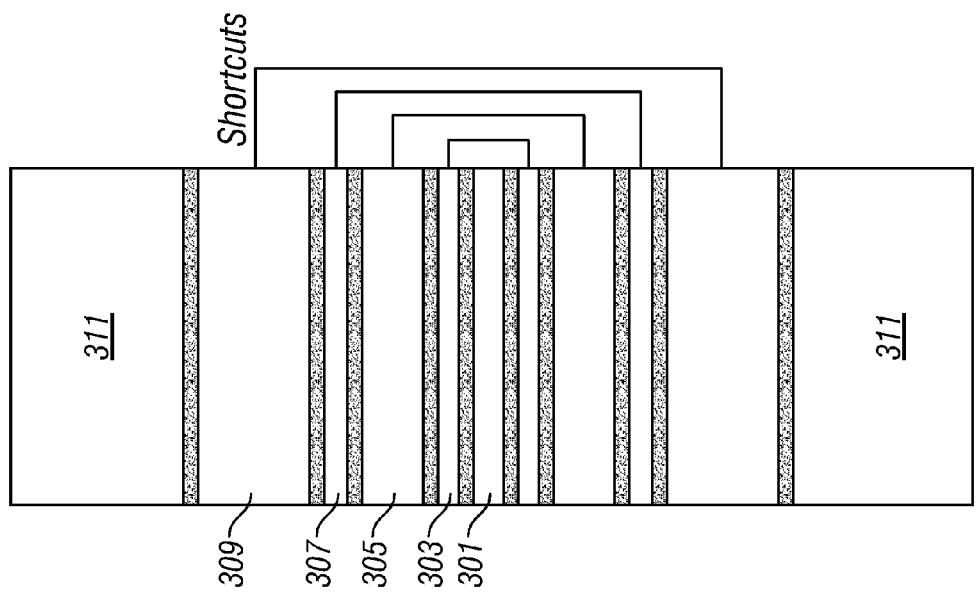
FIGS. 9a, 9b illustrate the cascading of guard electrodes.
Figure 9A:
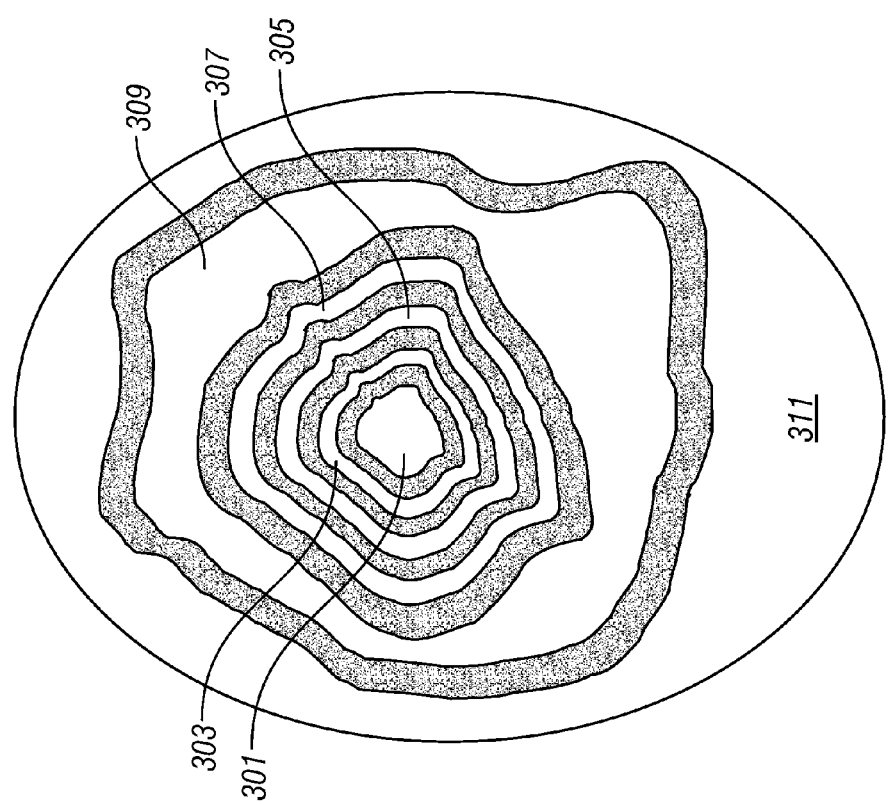

FIGS. 9a and 9b illustrate the cascading of shielding and guard electrodes on the basis of two shielding and two guard electrodes. A measurement electrode 301 is normally surrounded by a first shielding electrode 303 which is in turn surrounded by a first guard electrode 305. This is extended by surrounding the first guard electrode with a second shielding electrode 307. In this way the first guard electrode surrounded by the second shielding electrode could also be "shielded" like a measurement electrode. Continuing this principle of shielding inner guard electrodes, the assembly could now described as a measurement electrode which is surrounded by a shielding electrode and n-couples of inner guard and shielding electrodes. The whole assembly is finished by the outermost guard electrode 309. In FIG. 9a, flat electrodes of arbitrary shape are illustrated. The shielding and guard electrodes are of the same form as the measurement electrode. The outer guard electrode 309 may be of different shape and could be either a partial or full guard electrode. In FIG. 9b, ring electrodes are shown with suitable shorting. 311 is the body of the tool.

Figure 10:
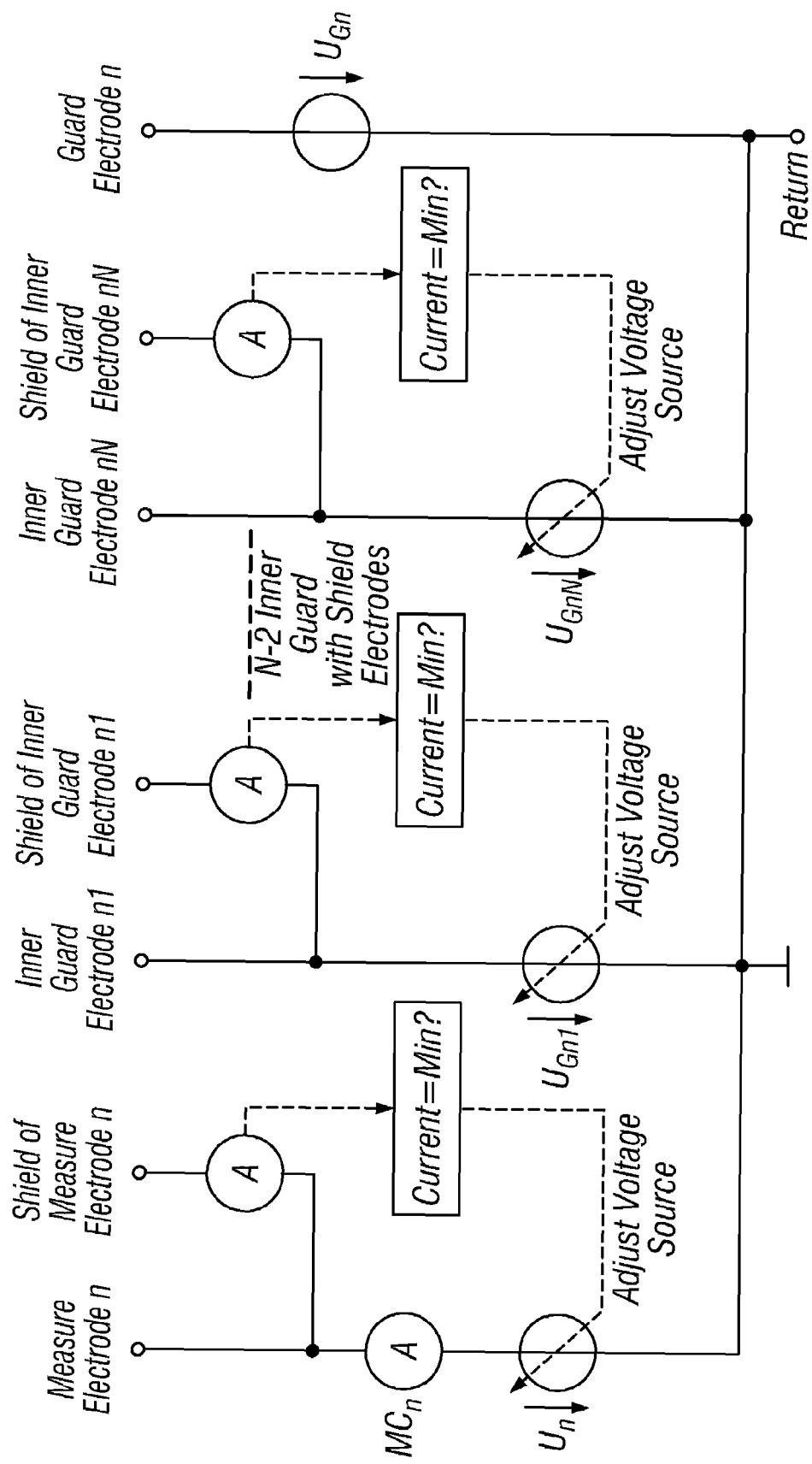
FIG. 10 illustrates a schematic diagram for operating the electrode configuration of FIGS. 9a–b.

FIG. 10 is a schematic illustration of the method of operating the embodiments of FIGS. 9a–b. The measurement and inner shielding electrode are operated as discussed above. The outer guard electrode is kept at a constant potential. Depending on the number of inner guard-shielding-electrode couples, the guard electrode potentials on each inner guard electrode is controlled by minimizing the shielding current of the corresponding shielding electrode. This could be achieved by using voltage or current sources as well as adjustable impedances. Where adjustable impedances are used, they may be connected in parallel to the guard voltage source or cascaded from one electrode couple to the next electrode couple.

Figure 11B:
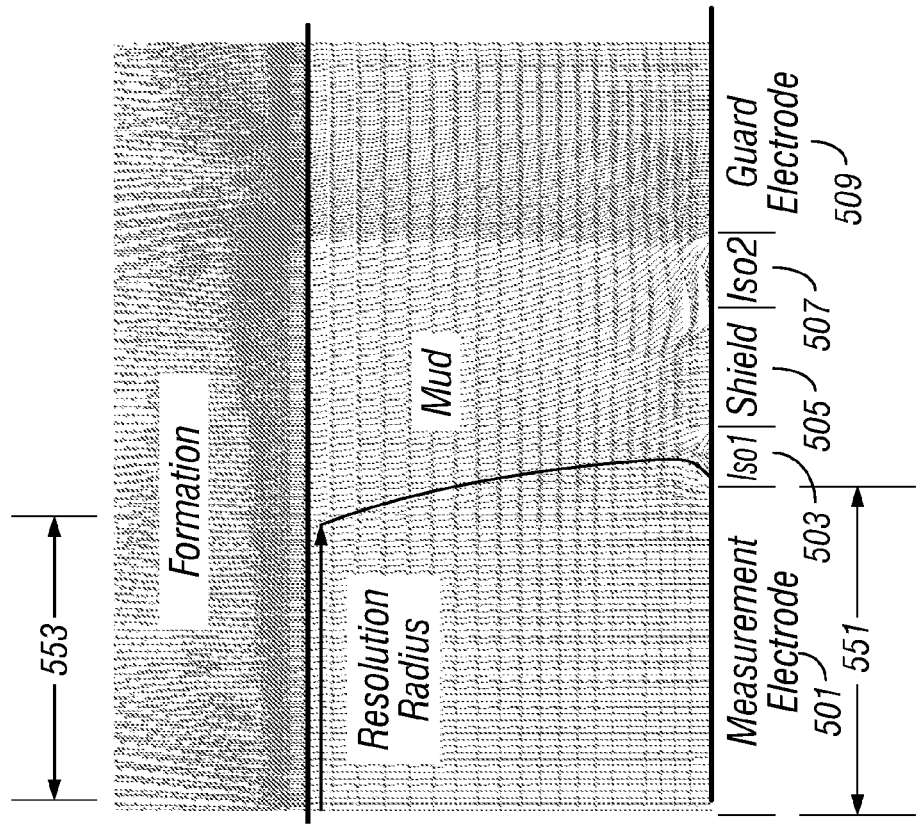
FIGS. 11a–b show a comparison of the electric field for a prior art device and a device according to the present invention.
Figure 11A:
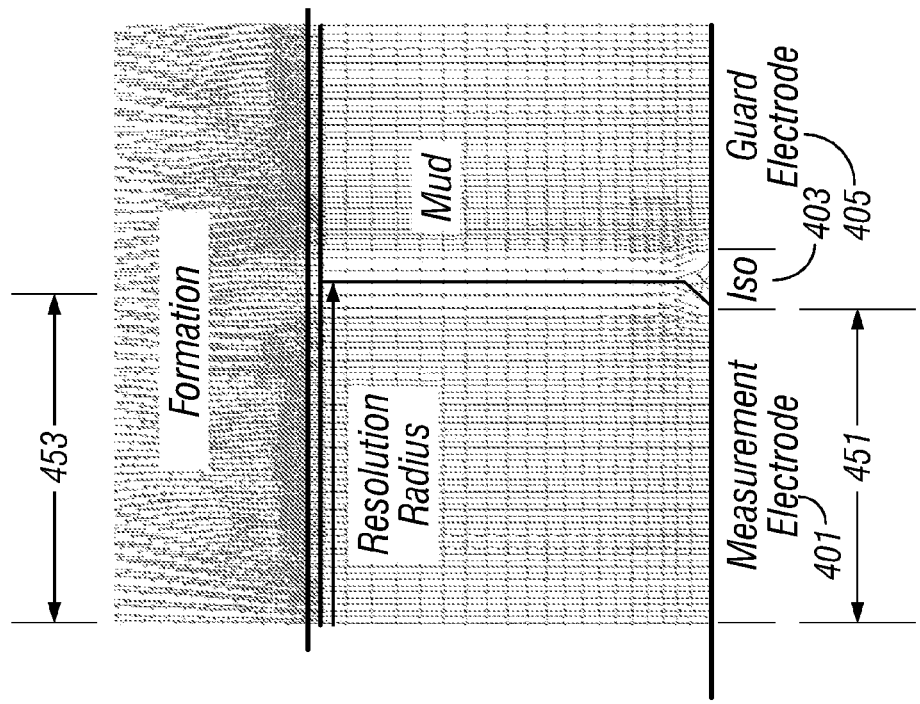

FIGS. 11a and 11b show a comparison of an electrode-configuration without and with additional shielding electrode. The illustrations show the electrical field for a model which is axially symmetric with respect to the perpendicular of the electrodes located at the center of the measurement electrode. FIG. 11a shows electrical field lines of a conventional electrode-configuration under ideal conditions (same potential on measurement and guard electrode and no contact impedances). The measurement electrode is denoted by 401, the guard electrode by 405 and the insulator by 403. In this case, the resolution radius 453 (radius within which the current of the measurement electrode penetrates the formation) is substantially the same as the radius 451 of the measurement electrode and half of the width of the insulator. FIG. 11b shows electrical field lines of an electrode configuration that includes a shielding electrode 505. The measurement electrode is denoted by 501. The insulators are denoted by 503 and 507. The potential of the guard electrode 509 is kept slightly higher than that of the measurement electrode by fulfilling the condition of no current flow between the measurement and the shielding electrode, so that a part of the guard current enters the shielding electrode and leaves it passing into the formation. The resolution radius 553 is less than the radius 551 of the measurement electrode, resulting in better focusing of the measurement current.

Figure 12:
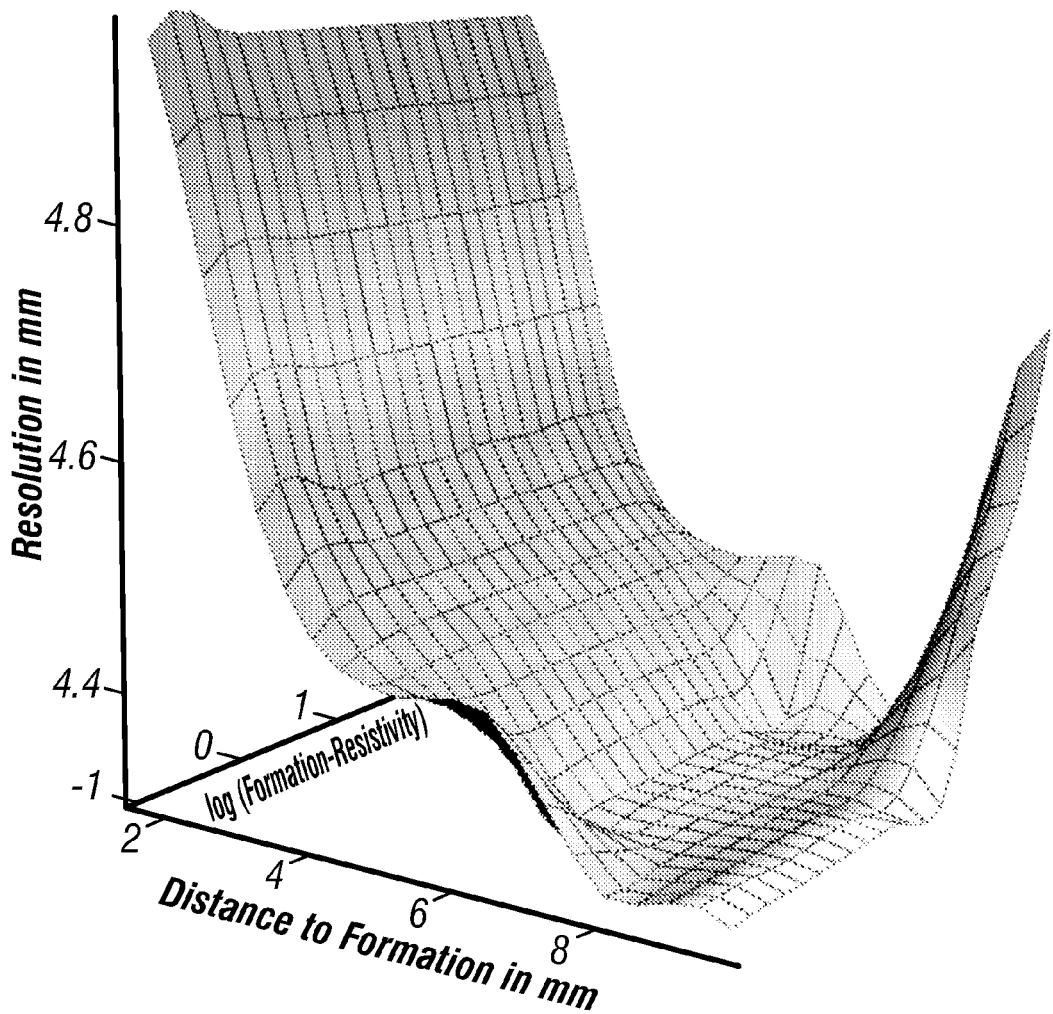
FIG. 12 is a plot of the resolution radius for a device according to the present invention as a function of tool standoff and formation resistivity for a mud resistivity of 0.02 Ω-m.

FIG. 12 is a perspective view of a 3-D plot of the resolution diameter as a function of the logarithm of formation resistivity and the distance between an exemplary tool and the formation for a mud resistivity of 0.02 Ω-m. An important point to note is that the resolution radius is substantially independent of formation resistivity. Additionally, over a relatively large range of standoffs (4 mm to 8 mm), the resolution diameter is substantially constant and, with a value of less than 4.4 mm, smaller than the diameter of the measurement electrode (5.08 mm). Plots for other values of mud resistivity (not shown) exhibit a similar behavior.

Figure 13:
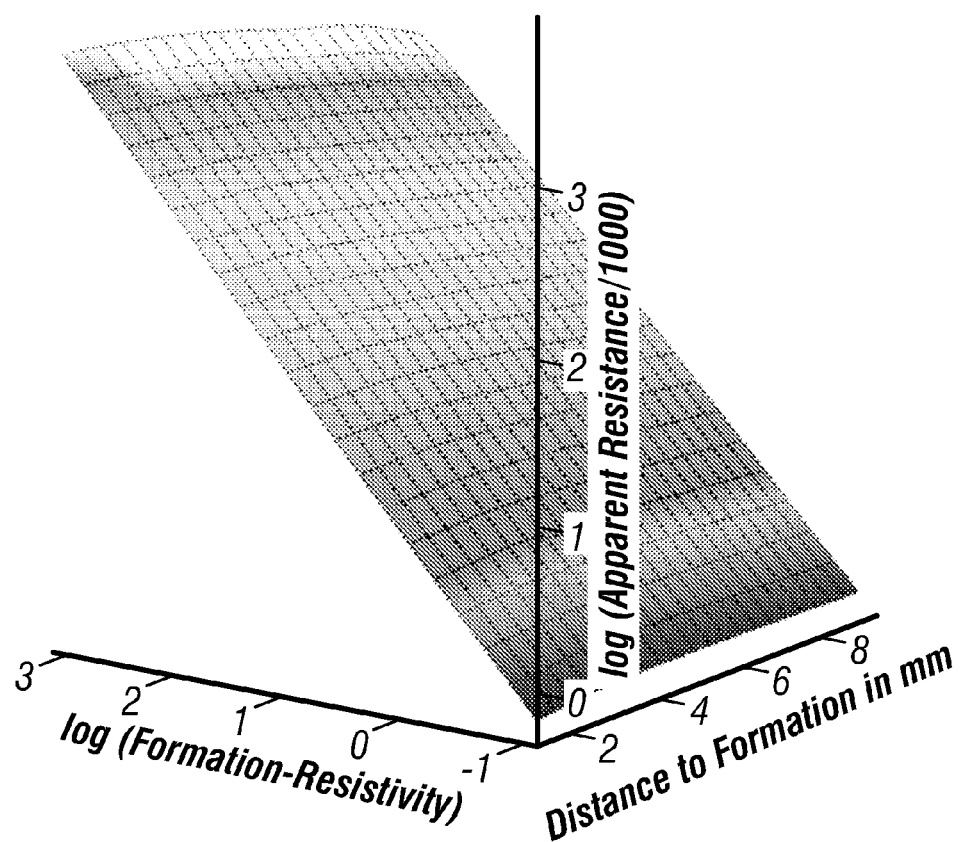
FIG. 13 is a plot of the apparent resistance for a device according to the present invention as a function of tool standoff and formation resistivity for a mud resistivity of 0.02 Ω-m.

FIG. 13 is a perspective view of a 3-D plot of the logarithm of the apparent resistance as a function of the standoff distance and the logarithm of the formation resistivity for a mud resistivity of 0.02 Ω-m. Two points are worth noting. First, and most importantly, the apparent resistance as measured by the tool is substantially linear with the formation resistivity. Secondly, the apparent resistance is substantially the same over a wide range of standoffs (2 mm–8 mm).

Figure 14:
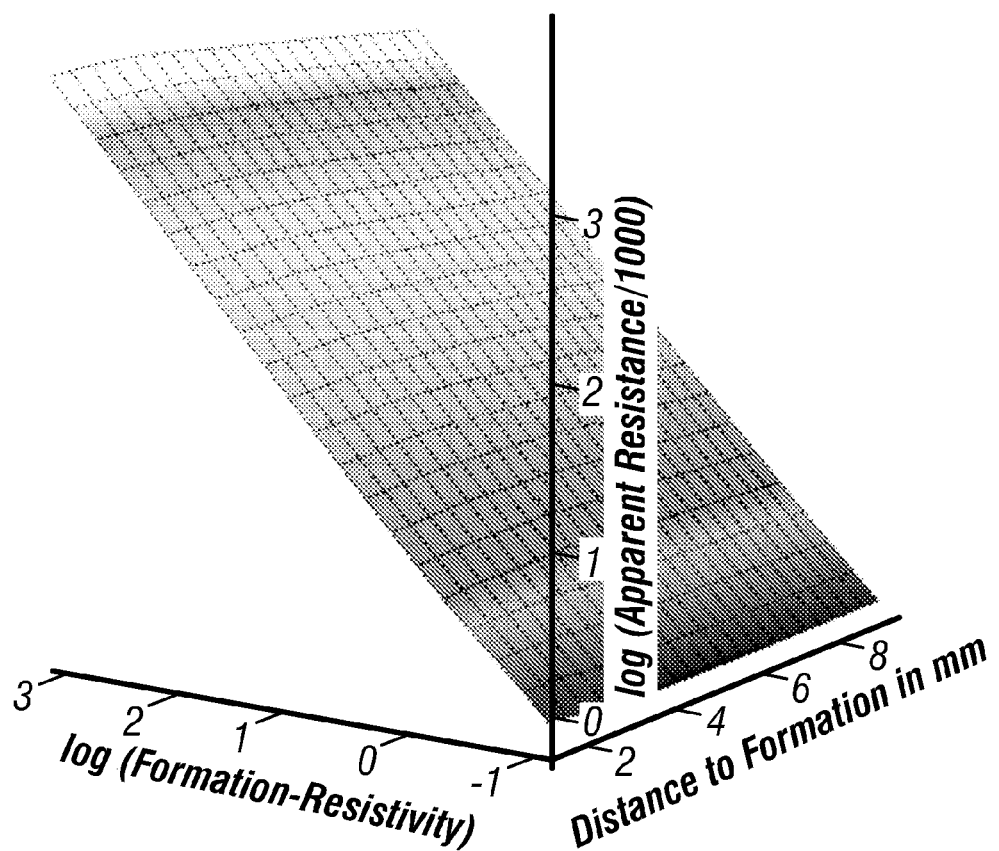
FIG. 14 is a plot of the apparent resistance for a device according to the present invention as a function of tool standoff and formation resistivity for a mud resistivity of 0.2 Ω-m.

FIG. 14 is a plot similar to FIG. 13 but for a mud resistivity of 0.2 Ω-m. Again, it is noted that the apparent resistance is substantially linear with the formation resistivity and substantially independent of the standoff. Comparing FIG. 14 to FIG. 13 shows that the apparent resistance does not appear to be affected noticeably by the mud resistivity.

Figure 15:
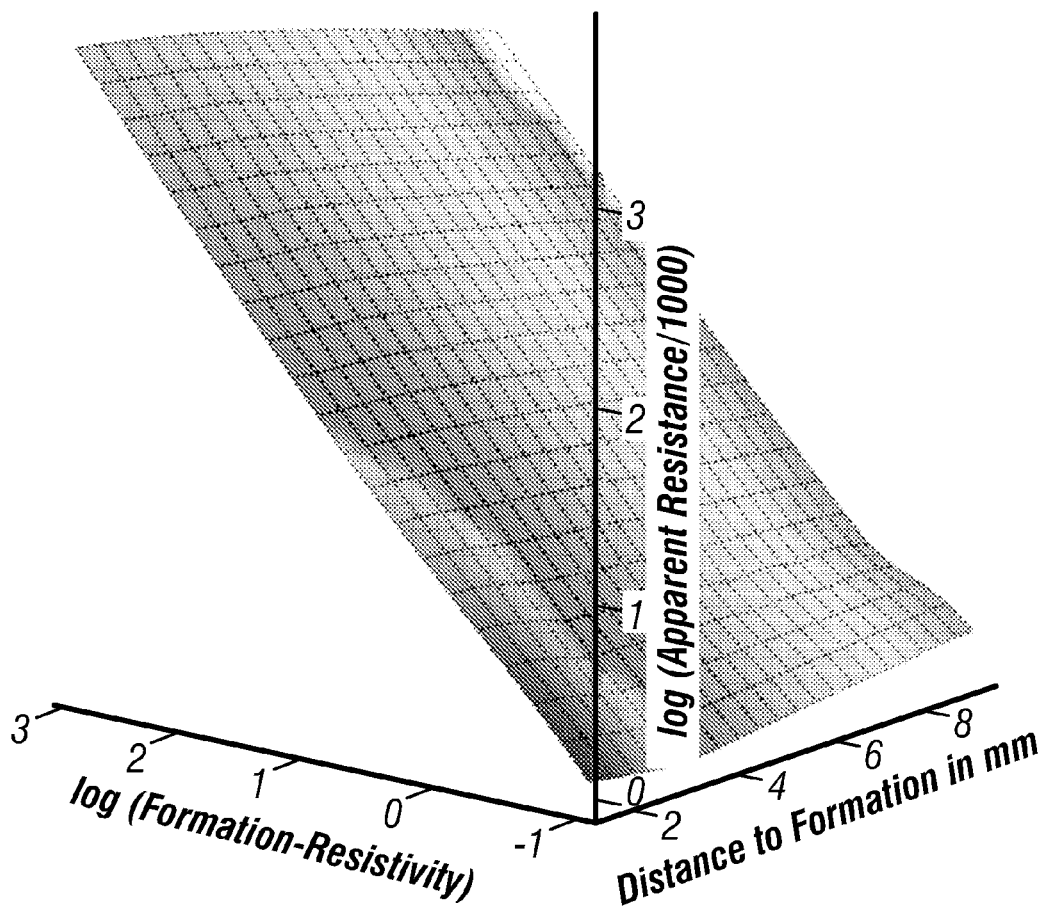
FIG. 15 is a plot of the apparent resistance for a device according to the present invention as a function of tool standoff and formation resistivity for a mud resistivity of 2 Ω-m.

Turning now to FIG. 15, a plot similar to FIG. 13 is shown for a mud resistivity of 2 Ω-m. Again, the apparent resistance is substantially linear with the formation resistivity, substantially independent of standoff and not noticeably affected by mud resistivity.

In one embodiment of the invention, suitable calibration curves are provided relating the apparent resistance to formation resistivity for different values of mud resistivity. The mud resistivity may be known ahead of time or may be measured in situ using a suitable device such as that disclosed in U.S. Pat. No. 6,801,039 to Fabris et al. having the same assignee as the present invention and the contents of which are fully incorporated herein by reference.

With the apparatus and method of the present invention, a resistivity image can be obtained in a MWD environment using orientation measurements by a suitable orientation sensor such as a magnetometer. Methods of producing such images are discussed, for example, in U.S. Pat. No. 6,173,793 to Thompson et al., having the same assignee as the present invention and the contents of which are incorporated herein by reference.

The processing of the data may be done by a downhole processor to give corrected measurements substantially in real time. Alternatively, the measurements could be recorded downhole, retrieved when the drillstring is tripped, and processed using a surface processor. Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for determining a resistivity parameter of an earth formation, the apparatus comprising:
   (a) a logging tool in a borehole in the earth formation, the logging tool having at least one measurement electrode configured to convey a measure current into the earth formation;
   (b) at least one guard electrode associated with the at least one measurement electrode configured to focus the measure current;
   (c) a shielding electrode interposed between the at least one guard electrode and the at least one measurement electrode; and (d) circuitry that minimizes a current flow between the at least one measurement electrode and the shielding electrode, the circuitry including a processor configured to alter at least one of (i) a potential of the at least one measurement electrode, (ii) an impedance between the at least one guard electrode and the at least one measurement electrode, and (iii) a potential of a least one guard electrode.

2. The apparatus of claim 1 wherein the processor is further configured to determine from the measure current and a potential of at least one of (i) the guard electrode, and (ii) the measurement electrode an apparent resistivity related to the resistivity parameter.

3. The apparatus of claim 2 wherein the processor is further configured to determine the apparent resistivity by using a relation of the form:

$$\rho_a = k \cdot \frac{U_{MG}}{I_M}$$

where $\rho_a$ is the apparent resistivity, k is a calibration factor, $U_{MG}$ is the voltage of at least one of (i) the guard, and (ii) the measurement electrode relative to a reference potential, and $I_M$ is the measure current.

4. The apparatus of claim 3 wherein the resistivity parameter comprises a formation resistivity and wherein the processor further determines the formation resistivity from the apparent resistivity.

5. The apparatus of claim 2 wherein the determined apparent resistivity is substantially independent of at least one of (i) a standoff of the logging tool, and (ii) a resistivity of a fluid in the borehole.

6. The apparatus of claim 1 wherein there is a standoff of between about 2 mm and about 10 mm between the logging tool and a wall of the borehole.

7. The apparatus of claim 1 further comprising a conveyance device configured to convey the logging tool into the borehole, the conveyance device being selected from the group consisting of (i) a drilling tubular with a bottomhole assembly carrying the logging tool, and (ii) a wireline.

8. The apparatus of claim 1 further comprising an orientation sensor configured to provide an output indicative of an orientation angle of the logging tool, the apparatus including a processor configured to produce a resistivity image of the formation using an output of the orientation sensor.

9. The apparatus of claim 1 wherein the at least one shielding electrode further comprises at least one second shielding electrode surrounding the at least one guard electrode.

10. The apparatus of claim 1 further comprising insulators positioned between (i) the at least one measurement electrode and the shielding electrode, and (ii) the shielding electrode and the at least one guard electrode.

11. The apparatus of claim 1 wherein the processor is at one of (i) a surface location, and, (ii) a downhole location.

12. The apparatus of claim 1 wherein the at least one measurement electrode, the shielding electrode and the at least one guard electrode comprise ring electrodes.

13. A method fo determining a resistivity parameter of an earth formation, the method comprising:
(a) conveying a measure current into the earth formation using a measurement electrode on a logging tooling in the earth formation;
(b) focusing the measure current using a guard electrode on the logging tool;
(c) shielding the measurement electrode from the guard electrode by a shielding electrode; and
(d) minimizing a current flow between the measurement electrode and the shielding electrode by a least one of (i) altering the potential of the measurement electrode, (ii) altering a potential of the guard electrode, (iii) altering an impedance between the guard electrode and the measurement electrode.

14. The method of claim 13 further comprising determining from the measure current and a potential of at least one of (i) the guard electrode, and (ii) the measurement electrode an apparent resistivity related to the resistivity parameter.

15. The method of claim 14 wherein determining the apparent resistivity further comprises by using a relation of the form:

$$\rho_a = k \cdot \frac{U_{MG}}{I_M}$$

where $\rho_a$ is the apparent resistivity, k is a calibration factor, $U_{MG}$ is the voltage of at least one of (i) the guard, and (ii) the measurement electrode relative to a reference potential, and $I_M$ is the measure current.

16. The method of claim 14 wherein the resistivity parameter comprises a formation resistivity determined from the apparent resistivity.

17. The method of claim 14 wherein the determined apparent resistivity is substantially independent of at least one of (i) a standoff of the logging tool, and (ii) a resistivity of a fluid in the borehole.

18. The method of claim 13 further comprising conveying the logging tool into the borehole on one of (i) a drilling tubular with a bottomhole assembly carrying the logging tool, and (ii) a wireline.

19. The method of claim 13 further comprising producing a resistivity image of the formation using orientation measurements.

20. A computer readable medium for use with a logging tool used in a borehole in an earth formation, the logging tool comprising:
(a) a measurement electrode which conveys a measure current into the earth formation;
(b) a guard electrode which focuses the measure current; and
(c) a shielding electrode positioned between the guard electrode and the measurement electrode,
the medium comprising instructions enabling a processor to:
(d) minimize a current flow between the measurement electrode and the shielding electrode by altering at least one of (i) a potential of the at least one measurement electrode, (ii) a potential of the at least one guard electrode, and (iii) an impedance between the at least one guard electrode and the at least one measurement electrode; and
(e) determine an apparent resistivity from a potential of the guard or measurement electrode and the measure current.

21. The medium of claim 19 selected from the group consisting of: (i) a ROM, (ii) an EPROM, (iii) an EAROM, (iv) a Flash Memory, and (v) an Optical disk

* * * * *